May 6, 1958     K. H. NORRIS ET AL     2,833,408
EGG SEPARATING MACHINE

Filed May 21, 1956     6 Sheets-Sheet 1

INVENTORS
K.H. NORRIS
A.W. BRANT

BY

ATTORNEYS

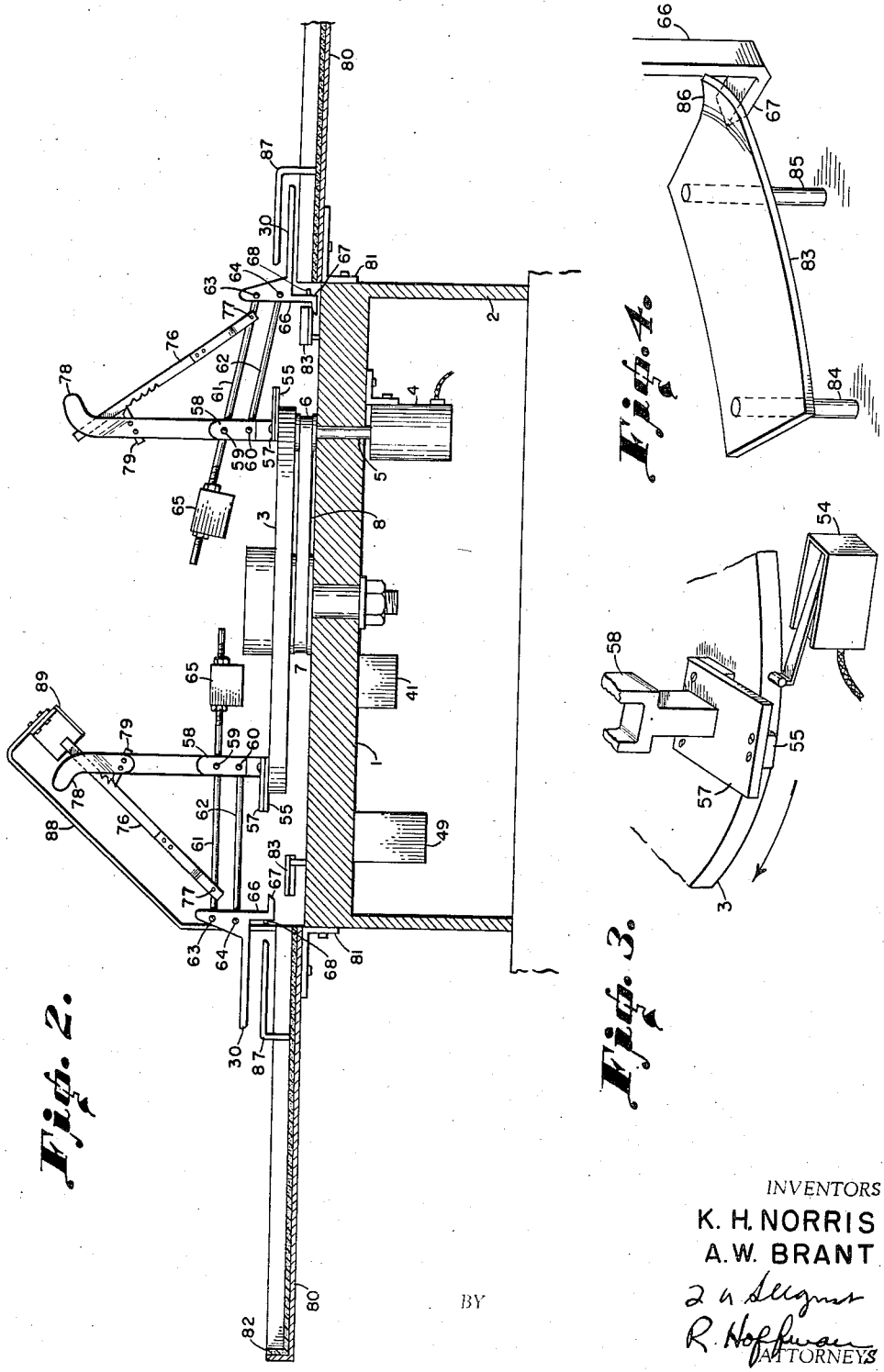

May 6, 1958
K. H. NORRIS ET AL
2,833,408
EGG SEPARATING MACHINE
Filed May 21, 1956
6 Sheets-Sheet 3
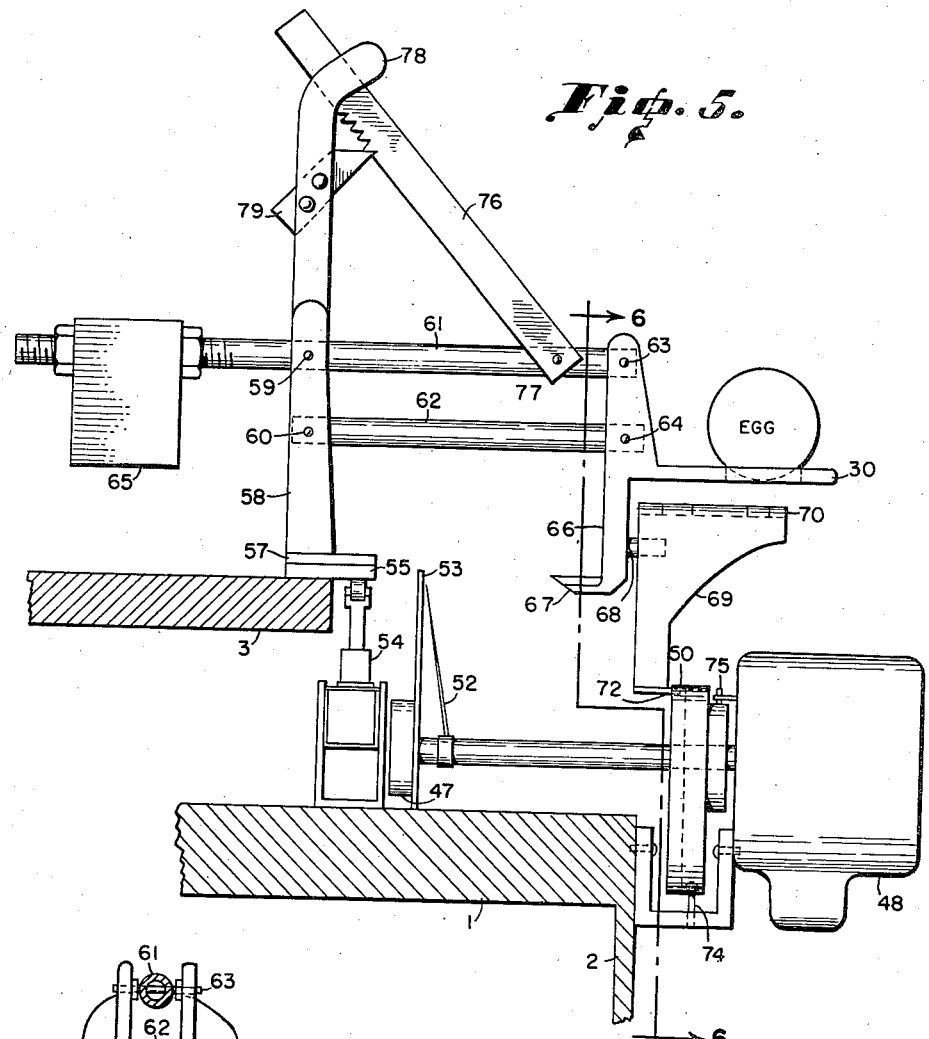
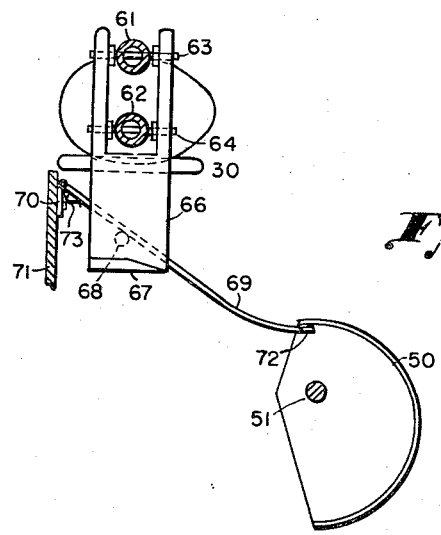
INVENTORS
K.H. NORRIS
A.W. BRANT
BY
ATTORNEYS May 6, 1958
K. H. NORRIS ET AL
2,833,408
EGG SEPARATING MACHINE
Filed May 21, 1956
6 Sheets-Sheet 4
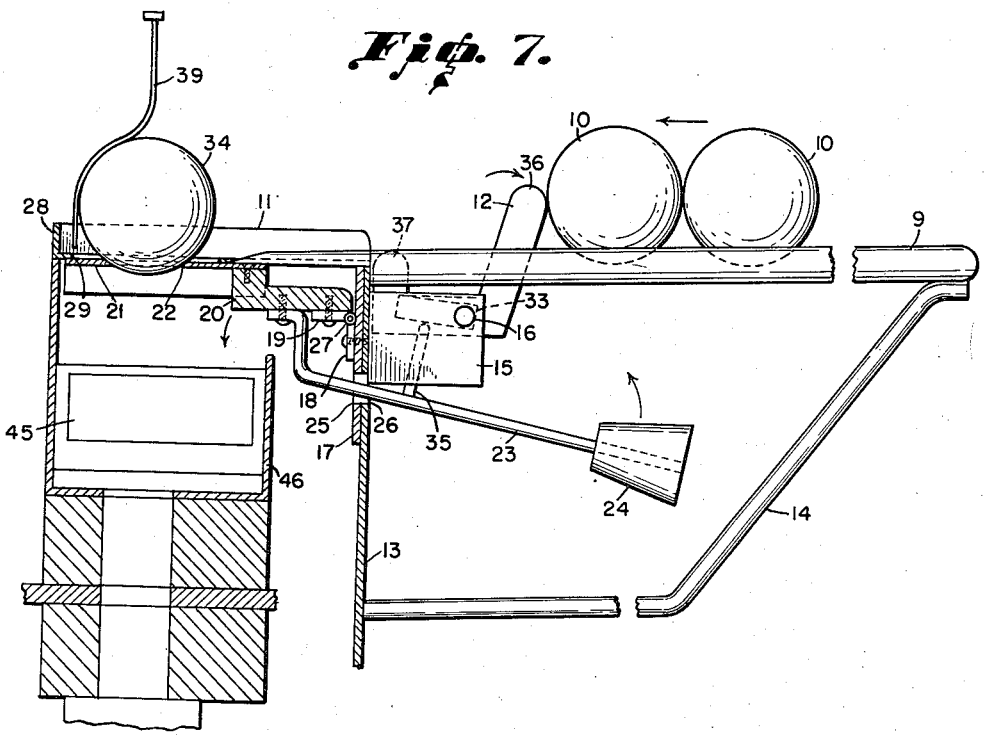
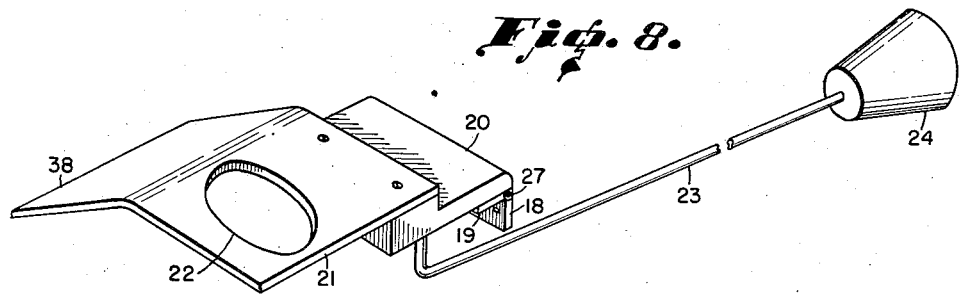
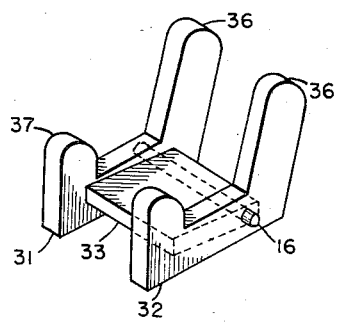
INVENTORS
K. H. NORRIS
A. W. BRANT
BY
ATTORNEYS May 6, 1958 K. H. NORRIS ET AL 2,833,408
EGG SEPARATING MACHINE
Filed May 21, 1956 6 Sheets-Sheet 6

INVENTORS
K.H. NORRIS
A.W. BRANT

BY R. Hoffman
ATTORNEY

United States Patent Office 2,833,408
Patented May 6, 1958

2,833,408

EGG SEPARATING MACHINE

Karl H. Norris and Albert W. Brant, Beltsville, Md.

Application May 21, 1956, Serial No. 586,332

4 Claims. (Cl. 209—111)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This application is a continuation-in-part of application Serial No. 414,237, filed March 4, 1954, now abandoned.

This invention relates to an apparatus for separating and classifying articles on the basis of their color. More particularly it relates to an endless carrier type of machine in which a number of egg-carrying trays are associated with a series of bins in such a manner that an egg of a given color will be ejected from its tray into a predetermined bin.

An object of this invention is to provide a machine in which color separation takes place automatically.

Another object is to provide such a machine in which the human factor is substantially eliminated and in which eggs of a given color will always be deposited in the proper bin together with other eggs of the same color.

Other objects will become apparent from the following description:

One feature of this machine consists in the utilization of a pair of photo-cells, one with a red and the other with a blue filter, as two of the arms of a self-balancing bridge circuit, to generate different voltages depending on the differences in the amounts of red and blue light reflected from the egg shell.

Another feature consists in amplifying these voltage differences and using the amplified voltage to cause rotation of a synchronous motor which carries the rotor of a balancing rheostat and a positioning cam on its shaft, the rotation of the motor causing a change of resistance of the rheostat with consequent balancing of the bridge, and setting the cam in a position corresponding to the color of the egg.

A further feature consists in the provision of means in the circuit for locking the synchronous motor in place while the shell-color measurement is transferred to the egg-handling mechanism.

A still further feature consists in the provision of means to automatically feed eggs one at a time from a mixed source to the measuring position from which they are then loaded on to their individual carrying trays.

Additional features consist in the various linkages and levers operated by the positioning cam whereby the carrying trays are fixed in predetermined positions to discharge their eggs into the proper bins.

The invention will be better understood from the following description and the accompanying drawings:

Figure 2 represents a vertical section through the apparatus taken on line 2—2 in Figure 1.

Figure 3 is an enlarged view of the microswitch assembly, which will be described in greater detail below.

Figure 4 is a detail of the depressor bar showing the method whereby it engages the finger on the egg-carrying tray. The function of this element will be described fully below.

Figure 5 is an elevation showing the construction of an egg-carrying tray and its positioning mechanism.

Figure 6 is a view taken on line 6—6 in Figure 5 showing the means by which the positioning cam, through its follower, sets the position of the carrying tray.

Figure 7 is an elevation of an assembly of the loading platform.

Figure 8 shows the details of construction of the platform on which the egg rests during the color measuring operation.

Figure 10 shows construction of the means for holding back the eggs on the loading platform and feeding them one at a time to the color-measuring station.

Figure 1:
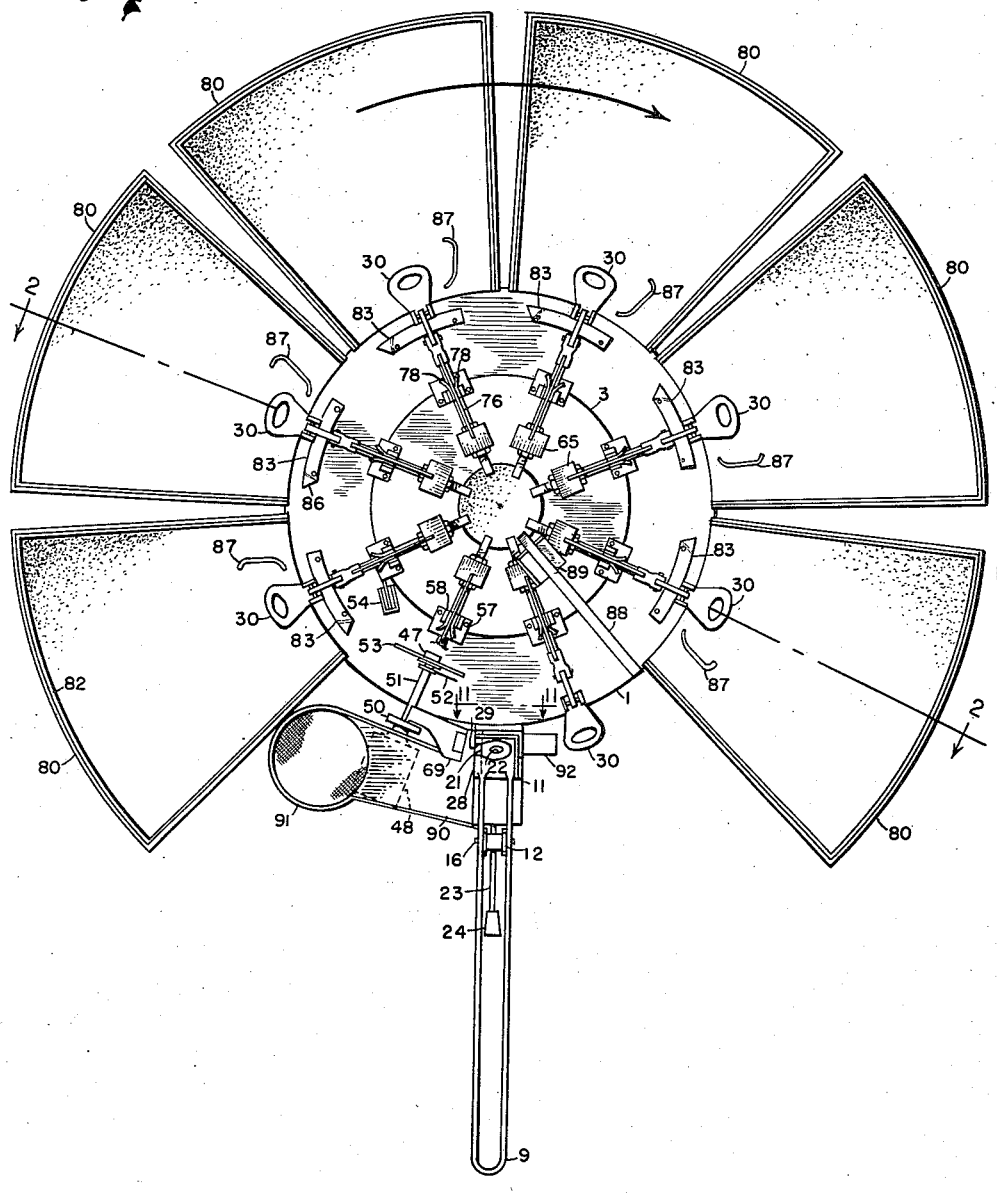
Figure 1 is a plan view of the completely assembled apparatus.

The machine essentially comprises three interconnected and dependent systems, namely, the egg-loading system, the egg-distribution system, and the optical-electrical system for measuring shell color and setting of the distribution system.

In particular, the apparatus comprises a stationary bed or base plate 1 which may be provided with suitable supporting means, such as legs 2. Rotatably mounted on the stationary bed by means of suitable bearings is a turntable 3. Motor 4, mounted beneath the base plate, has a shaft 5 protruding through the upper surface of the base plate, which shaft is provided with a pulley 6.

A pulley 7, secured to the turntable shaft is driven by pulley 6 by means of belt 8. A track-like loading platform 9 is provided to support a number of unassorted eggs 10 of mixed color. See Figure 7. Eggs are fed one at a time to the color measuring station 11 by means of stop 12, whose construction and operation are described below.

The egg loading mechanism is mounted on plate 13 which may be secured to the frame of the machine in any suitable manner. A bracket 14 between plate 13 and platform 9 is provided for purposes of rigidity. A pair of brackets 15 are secured to plate 13 at right angles thereto and serve as bearings for pin 16 which acts as a pivot for stop 12. On the side of plate 13 opposite brackets 15 there is secured another plate 17 to which one face 18 of a hinge is rigidly secured. The other face 19 of the hinge is secured to plate 20, on which is mounted platform 21 provided with hole 22. Measurement of shell color takes place while an egg is supported over hole 22 in platform 21. Beneath plate 20 there is secured one end of a lever 23 which carries at its other end a counterweight 24. This lever protrudes through a pair of congruent holes 25 and 26 cut in plates 17 and 13, respectively.

In operation, a number of eggs 10 are loaded onto platform 9. The latter is inclined so that the eggs will roll by gravity toward the color measuring station. When no egg is supported on the platform 21, the center of gravity of the system comprising the platform 21, plate 20, lever 23, and counterweight 24 is such as to apply a clockwise rotational force about hinge pin 27.

However, clockwise rotation about pin 27 is prevented by tray 28 which is above platform 21, and may either be part of or secured to plate 13.

This tray is provided with a U-shaped opening 29 which is large enough to permit a substantial portion of the egg to protrude beneath the under surface of the tray. This opening is larger than hole 22 in platform 21, but is not large enough to permit an egg to drop through. Platform 21, being larger than opening 29, normally is kept against tray 28 by the weight of counterweight 24.

The egg-carrying trays 30 (described more fully below) operate the loading mechanism. As previously stated, the eggs 10 are kept back on the loading platform by means of stop 12. This means consists of two generally U-shaped pieces 31 and 32 separated by block 33, which is rigidly secured to the two pieces 31 and 32. The two legs of the U are not of equal length, nor are they parallel, as shown in Figures 7 and 10. When the machine is not in operation, or during the time that the shell color of an egg 34 is being measured, counterweight 24 keeps measuring platform 21 against tray 28. A pin 35, perpendicularly mounted on lever 23, bears against block 33, thereby causing the longer leg 36 of the stop to prevent further advance of the egg 10 down loading platform 9. In this position the shorter leg 37 is level with the top of loading platform 9.

As turntable 3 begins to rotate in a clockwise direction (Fig. 1) one of the carrying trays 30 engages the under surface 95 of guide plate 92 which is attached to the side of tray 28. Under surface 95 of guide plate 92 slopes downward in the direction of travel of tray 30 until it reaches a depth slightly below the under surface of tray 28. At that point it joins horizontal surface 96. As a carrying tray 30 approaches the measuring station, it is engaged by sloping surface 95 of plate 92 and forced downward until it reaches a position determined by horizontal surface 96. Tray 30 is thus depressed to a position below tray 28. As tray 30 continues its travel its leading edge 94 engages sloping surface 38 of platform 21, thus depressing the latter, forcing it to pivot downward about hinge pin 27. Pin 35 forces block 33 and stop 12 to rotate as shown by the arrow (Figure 7). As tray 30 comes between platform 21 and tray 28, lever 23 reaches its maximum deflection. At this point the length of leg 36 is so proportioned as to permit an egg to roll over it by further forcing that end downward to a position level with platform 9. In this position, the block 33 is beyond the reach of pin 35. However, when leg 36 is forced downward, short leg 37 rises above platform 9 and prevents further progress of the egg. The weight of the egg causes partial counterclockwise rotation of stop 12, which rotation is limited by the position of pin 35. The egg is therefore maintained at rest against leg 37 as long as tray 30 is present between platform 21 and tray 28, while leg 36 has again risen sufficiently above platform 9 to prevent the next egg from rolling down. As soon as carrying tray 30 travels out from between tray 28 and platform 21, the latter immediately rises again, pin 35 drops, permitting leg 37 to reassume its position level with the surface of platform 9, and simultaneously permitting the egg, shown as 34 in Figure 7, to roll onto measuring platform 21. A rubber blanket 39 is provided to prevent unnecessary jarring of the egg as it comes to rest over hole 22. Since rotation of turntable 3 is continuous, the next carrying tray will pick up the egg for distribution. It is therefore evident that each carrying tray sets up an egg for the next succeeding tray. It is during the interval corresponding to the distance between two trays that color measurement takes place and during which the apparatus is set for proper distribution.

As stated above, rotation of the turntable is continuous.

Figure 11:
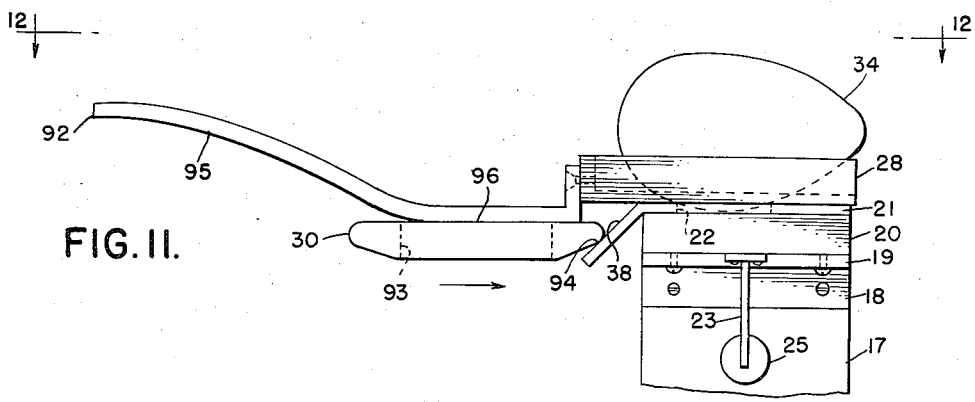
Figure 11 is a horizontal elevational view taken on line 11—11 of Figure 1 showing the means whereby an egg is transferred to a carrying tray after its color has been measured.
Figure 12:
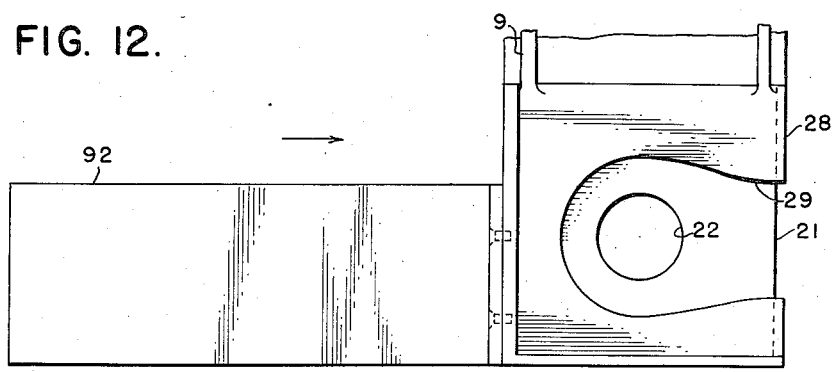
Figure 12 is a view from line 12—12 on Figure 11 showing the plan relationship of the elements of Figure 11.

Thus, after one egg-carrying tray 30 has caused an egg to be deposited at the measuring station on tray 28, the egg-carrying tray immediately following it is prepared to pick the egg up for distribution, as described below. The egg is picked up and carried away in the following manner:

As described above, tray 28 is provided with an opening 29 which is open in the direction of travel of the turntable (shown by the arrows in Figures 11 and 12). Opening 29 is large enough so that, when an egg is at rest at the color-measuring station, the egg does not touch the edges of the opening, but is supported entirely by the edges of hole 22 of platform 21. Opening 29 is not large enough, however, to permit the egg to drop through when platform 21 is depressed, nor is it large enough to permit the egg to protrude to a level below horizontal surface 96 of guide 92. After tray 30 has reached its low point, as determined by surface 96, leading edge 94 of tray 30 engages sloping surface 38 of platform 21. This causes platform 21 to be depressed, with the result that tray 30 assumes a position between tray 28 and platform 21. The width of tray 30 is so selected that it remains engaged by surface 96 until hole 93 of tray 30 is directly under the egg. At that moment, tray 30, which has been kept a slight distance beneath tray 28, slips out from under surface 96 and is forced against the under surface of tray 28 by means of counterweight 65. Hole 93 is sufficiently smaller than opening 29 to cause the egg to be raised above the edges of opening 29 and to be supported entirely by the edges of hole 93. In this manner, the egg, whose color was measured in the interval between the passage of two succeeding trays 30 is carried away by the second of these trays, while at the same time, this second tray sets up a second egg for the third tray 30. This process is continuous.

The color measuring system comprises a suitable source of light, as for example, a six-volt, 100-watt projector lamp 40 operated from a transformer. Lens 42 collimates the beam of light 43 and directs it at the egg 34 which is at rest over hole 22 in platform 21. The light is reflected back to a pair of photocells 44 and 45 placed at an angle of 45° to the incident light which is normal to the viewing surface of the egg. One photocell is provided with a blue filter; the other with a red filter. Enclosing the photocells is a metal box 46 (Fig. 7) which excludes ambient light and, at the same time, provides electrostatic shielding.

Figure 9:
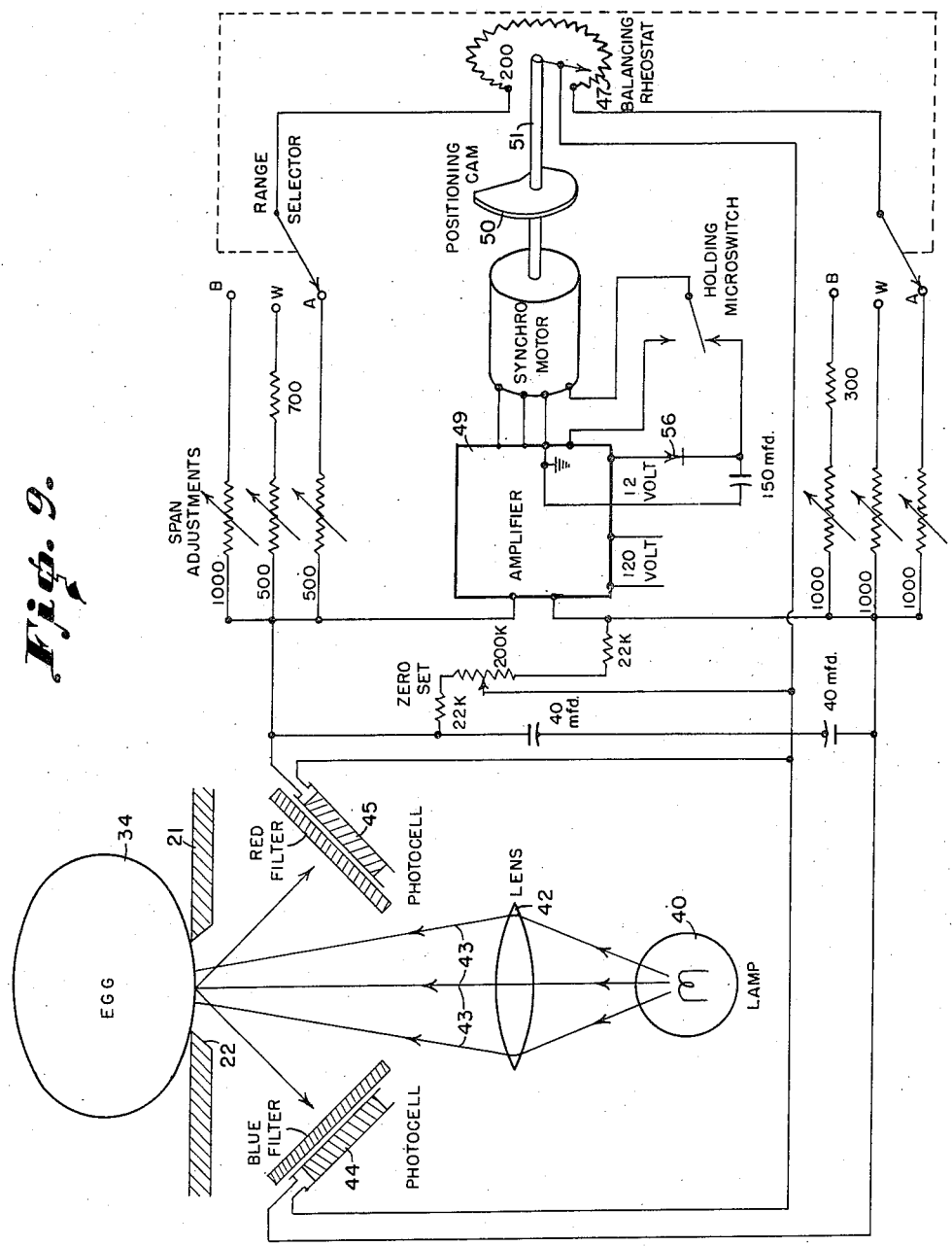
Figure 9 is a schematic diagram of the color measuring circuit, the symbol, K, representing 1000 ohms.
Figure 13:
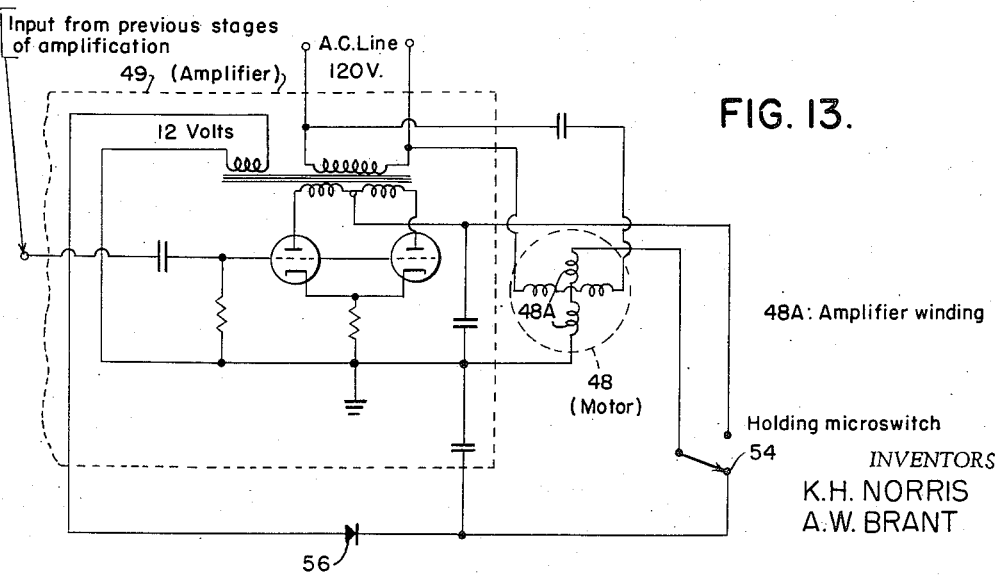
Figure 13 is a circuit diagram showing the details of the connections between the two windings of the synchronous motor and the final stage of the amplification system.

The circuit to make the necessary shell color discrimination is shown schematically in Figures 9 and 13. The two photocells make up two arms of a self-balancing bridge circuit, with the span-adjusting resistors and the balancing rheostat 47 mounted on the rotor of a synchronous motor 48 forming the other two arms. An electronic amplifier 49 detects any unbalance in the bridge and amplifies this voltage differential to drive the synchronous motor 48 until a new balance is reached. Thus when differences in shell color cause a change in the ratio of light received by the two photocells, the change is quickly balanced out by the synchronous motor shifting the rheostat to a new point. The position of the motor, therefore, becomes a measure of shell color. This shift of position of the motor with a change in shell color is utilized to position the distributing mechanism by means of cam 50, also mounted on the shaft 51 of the synchronous motor. The span-adjusting resistors shown in Figure 9 control the sensitivity of the measuring circuit, which is the change in angle of rotation of the synchronous motor for a given difference in shell color. The range selector switch permits three pre-set ranges of color separation by switching to one of three different span-adjusting combinations. These adjustments provide more than adequate capacity to give the desired separation over the full range of normal shell colors. As shown in Figure 9, the circuit is set for the "A" position of the range selector switch. This will measure shell color over the entire range of from white to dark brown. Switch position W is used for lots of eggs ranging in color from white to light brown, while position B is used for eggs ranging in color from light brown to dark brown.

A zero adjustment provides the means to compensate for changes in the light source and the photocells which occur with aging. After the circuit has had a warm-up period, the zero is adjusted against a reference standard placed in the egg measuring position. A pointer 52 mounted on shaft 51 travels over stationary dial 53 whose abritrary calibrations assist in making the zero adjustment.

One of the novel features of this invention includes the provision in the circuit of means for locking the synchronous motor in place while the shell color measurement is being transferred to the egg-handling mechanism. This is accomplished by applying a direct current to the amplifier winding of the synchronous motor while the egg-carrying arm (described below) is being positioned. By "amplifier winding" is meant the winding of the motor which is connected to the amplifier. During the color-measuring period only, a microswitch 54, operated by cams 55 on turntable 3, disconnects the amplifier winding of the motor from the direct current source and connects the winding to the amplifier. The direct current source for locking the motor is obtained by rectifying the 12-volt signal available from the power transformer of the amplifier unit, as indicated at 56 in Figure 9.

The distributing system of the invention comprises a plurality of similar beam balances radially mounted on turntable 3. In particular, these balances comprises a horizontal mounting block 57 secured to the turntable near the periphery thereof, with a bifurcated vertical bracket 58 secured to the block. This vertical bracket serves to provide the two stationary pivot points 59 and 60 for the parallel balance beams 61 and 62, respectively. The other two pivot points 63 and 64 of beams 61 and 62, respectively, are secured to the egg-carrying tray 30. An adjustable weight 65 on upper beam 61 counterbalances the weight of tray 30 and maintains the latter in its highest position so as to operate the egg-loading mechanism, as described below.

Each tray 30 is provided with a downwardly extending portion 66 which has at its end a normally extending finger 67 and, at an intermediate point, a roller 68.

As described above, the difference in the amount of red and blue light reflected from the surface of the egg whose color is being measured, causes the bridge circuit to become unbalanced, whereupon the synchronous motor shifts to adjust the rheostat to a new position of electrical balance. The position of cam 50 thus becomes a measure of the shell color. To transfer this measurement to the egg-handling system, there is provided a cam follower 69 which is hinged by means of hinge 70 to a stationary member 71 secured to the frame of the machine. Contact between cam 50 and cam follower 69 is maintained through finger 72, provided at the free end of the cam follower, by means of spring 73 inside hinge 70. Pins 74 and 75 serve as cam stops and define the maximum angle through which the cam is permitted to rotate.

When an egg is deposited on platform 21 for color measurement cam 55 on the bottom of mounting block 57 depresses microswitch 54, connecting the amplifier winding of the synchronous motor to the amplifier. The length of cam 55 is so designed as to allow sufficient time for the bridge circuit to reach a balance. As soon as that state is reached the microswitch is released, reconnecting the amplifier winding of the synchronous motor to the direct current source. This prevents cam 50 from changing position. As the color measurement is completed and cam 50 is locked in position a tray passes under the egg and carries it away in a clockwise direction (Fig. 1). In the meantime, cam 50 has caused cam follower 69 also to be locked in a position corresponding to the color of the egg. Different colors will cause the free end 72 of the cam follower to be fixed at different heights. Therefore, as tray 30, carrying the egg, reaches cam follower 69, roller 68 will engage the lower surface of the cam follower and pull the tray down to a particular level determined by the positions of cam 50 and cam follower 69. A toothed rack 76, having its upper end free and its lower end pivoted at 77 on the upper beam 61, and guided longitudinally by forked guides 78, will also move down in accordance with the movement of tray 30. When the maximum downward movement has been achieved, a pawl 79, rigidly secured between the forks 78, locks the rack in place and prevents return upward movement of the latter. Egg-carrying tray 30 has thus been pulled down to and locked in a position which corresponds to the particular color measurement.

There now remains only to provide for distributing the eggs in accordance with their particular color. Since the electrical characteristics of the measuring circuit for each position of the range selector (Fig. 9) permit a sharp separation into six colors, there are provided six stationary bins 80 around the periphery of base 1 of the machine. These bins are secured to the base by any suitable means, as by bracket 81, and are lined with a soft material 82, to prevent breakage when the eggs are deposited. Each bin has mounted in front of it a depressor bar 83. The depressor bars are disposed in a circle, and are secured to base 1 by a pair of standards 84 and 85. The distance of the bars from the center of the circle is such that they will engage the fingers 67 extending from the lower ends of the egg-carrying trays. Each depressor bar is provided with a raised leading edge 86 to provide for smooth engagement with finger 67. Furthermore, the height of each standard 85 above the base becomes progressively greater in a clockwise direction around the base, while each standard 84 is substantially of equal length. In this manner there is provided a series of depressor bars whose leading edges 86 become progressively higher, while their lower ends are all substantially the same height above the base. An egg carrying tray, fixed in a particular position by means of cam 50 and cam follower 69, will travel in a clockwise direction until it reaches a depressor bar whose leading edge is high enough to just engage finger 67. Continued travel causes the depressor bar to pull the egg carrying tray down to the lowest position, determined by the height of standard 84. When this occurs, an ejector bar 87, one mounted in each bin, engages the egg and causes it to fall into a bin.

The unloaded tray is now ready to return to the measuring platform to pick up another egg. In order to raise the tray to its highest position where it will engage the measuring platform, as previously described, it is necessary to release rack 76 from pawl 79. This is accomplished by providing, immediately following the last bin, a bracket 88 secured by one of its ends to the frame of the machine and carrying at its upper end an angularly-disposed plate 89 which is inclined upward in the direction of rotation of the turntable. The leading edge of this plate is set sufficiently low to permit the upper end of rack 76 to pass over it. Since the plate slants upward, continued rotation of the turntable causes the end of rack 76 to gradually be pushed high enough so that its teeth no longer engage pawl 79. Counterbalancing weight 65 is thus permitted to drop and simultaneously raise tray 30 to the position required for operating the egg-loading mechanism, whereby the tray is in position to commence another cycle.

To prevent breakage of eggs which may fall from platform 21 due to faulty positioning thereon, there is provided a chute 90 secured to the loading platform beneath the color measuring position, and a wire basket 91 suspended from the end of the chute. Eggs failing to come to rest over hole 22 will roll down chute 90 and be caught in basket 91, from which they may be recovered.

We claim:

1. Apparatus for separating eggs according to shell color comprising: a stationary support; a rotatable table mounted on said support; a plurality of stationary bins disposed in a circular arc about said support; a plurality of similar radially disposed vertically adjustable egg-carrying mechanisms comprising egg-carrying trays mounted on said rotatable table; egg-supporting means secured to the stationary support in advance of the first of said bins adapted to hold a single egg; egg-loading means secured to the stationary support adapted to deposit one egg on said egg-supporting means when actuated by a first of said egg-carrying trays, said egg-carrying trays being adapted to pass beneath said egg-supporting means whereby a second of said egg-carrying trays removes the egg deposited on said egg-supporting means while simultaneously actuating the egg-loading means to deposit another egg on the egg-supporting means; color measuring means comprising illuminating means for projecting a beam of light at an egg while the latter is on said egg-supporting means and photoelectric means for receiving light reflected from said egg; a self-balancing electrical bridge circuit including said photoelectric means and a balancing rheostat as legs of said bridge circuit; an amplifier having an input side and an output side for amplifying differences in voltage produced by said photoelectric means due to differences in shell color, the photoelectric means being connected to the input side of the amplifier; a synchronous motor responsive to said differences in voltage having one winding connected to the output side of the amplifier, said motor carrying said balancing rheostat and a positioning cam on its shaft; a cam follower adapted to constantly engage said positioning cam, said cam follower being so located as to engage in transit contact means rigidly dependent from the aforementioned egg-carrying trays, said egg-carrying trays being positioned in accordance with the position of the cam follower; means secured to the egg-carrying trays adapted to lock said trays in the position fixed by the cam follower; a plurality of stationary depressor bars equal in number to the number of stationary bins and located directly in front thereof, said depressor bars having their leading edges at progressively increasing heights above the stationary support in the direction of rotation of the rotatable table and having their distant edges at substantially equal heights above the stationary support, said distant edges always being lower than the leading edges; means rigidly depending from each aforementioned egg-carrying tray adapted to engage the lower surface of a depressor bar whose leading edge is at a height corresponding to the height of the tray and to draw said tray down to the lower level of the distant edge of said depressor bar; egg-ejector means associated with each depressor bar adapted to engage the egg being carried on the tray and deposit said egg in the bin associated with said depressor bar; and means in advance of the color-measuring station secured to the stationary support of the apparatus after the last bin adapted to release the egg-carrying tray from the position fixed by the cam follower whereby the egg-carrying tray is restored to a position for actuating the loading mechanism.

2. The apparatus of claim 1 in which each egg-carrying mechanism comprises a base rigidly secured to the rotatable table; a vertical bifurcated bracket rigidly mounted on said base; a pair of parallel beams extending radially from the center of the turntable and being pivoted in said bifurcated bracket and also in an egg-carrying tray; a linearly adjustable weight on one of said parallel beams to counterbalance said egg-carrying tray; rack means pivoted to one of said beams at an intermediate point thereof; a pair of parallel guide-members extending upward from the bifurcated bracket and adapted to restrict movement of said rack means to a linear direction; pawl means rigidly mounted in said guide members adapted to permit downward motion of said egg-carrying tray and rack means but to prevent upward return motion of the same; said rack and pawl means together constituting the means of claim 1 adapted to lock said egg-carrying tray in the position fixed by the cam follower; and an L-shaped finger extending downward from a point on the egg-carrying tray constituting the means of claim 1 adapted to engage the lower surface of a depressor bar.

3. The apparatus of claim 1 in which the egg-loading mechanism comprises a support member rigidly secured to the stationary support of the apparatus; an inclined loading platform rigidly secured to one side of said support member and adapted to hold a number of eggs and to restrict the rolling of said eggs to a direction longitudinal of said loading platform; a stationary horizontal tray rigidly secured to the other side of said support member, said tray being so positioned as to receive an egg rolling down the inclined loading platform, said tray being provided with an opening in its horizontal surface large enough to permit a substantial portion of an egg to protrude therethrough but small enough to support said egg; rotatable stop means pivotally secured to the aforementioned support member on the same side thereof as the loading platform, said stop means having end protruding upward through the inclined loading platform whereby progress of an egg on said loading platform past said stop means is prevented; a vertically rotatable measuring platform secured through a hinge at one end thereof to the aforementioned support member on the same side thereof as the stationary horizontal tray, said measuring platform being positioned directly beneath said stationary tray, said platform being provided with a hole smaller than the opening in the stationary tray, said hole being directly beneath said opening, said platform being further provided with a downwardly inclined sideward extension; an elongated lever secured by one end thereof to the bottom of said rotatable measuring platform extending downwardly and rearwardly through the aforementioned support member to a position beneath the loading platform; a counterweight secured to the other end of said lever of sufficient weight to force the measuring platform against the bottom of the stationary tray; and a normally extending rigid member secured to the lever in such position as to contact and cause rotation of the aforementioned stop means when downward pressure on the inclined surface of the measuring platform causes upward rotation of the lever, said normally extending rigid member being of sufficient length to cause rotation of the protruding ends of the stop means to a point beneath the surface of the inclined loading platform whereby it no longer obstructs downward rolling of the egg resting thereagainst.

4. In the apparatus described in claim 1, a low-voltage source of direct current, switching means adapted to alternately connect the amplifier-connected winding of the synchronous motor to the output side of the amplifier and to the source of direct current, and cam means mounted at spaced points around the periphery of the rotatable table of said apparatus adapted to periodically operate said switching means, whereby the said amplifier-connected winding of the motor is disconnected from the source of direct current and simultaneously connected to the output side of the amplifier.

References Cited in the file of this patent

UNITED STATES PATENTS

| | | |
|---|---|---|
| 1,294,740 | Winkley | Feb. 18, 1919 |
| 1,432,762 | Ladd | Oct. 24, 1922 |
| 2,139,574 | Butterfield | Dec. 6, 1938 |
| 2,178,203 | Fausel | Oct. 31, 1939 |
| 2,678,725 | Jacobson | May 18, 1954 |